Nov. 30, 1965 P. C. GRUNSTRA 3,220,390
RODLESS ROTARY ENGINES
Filed Nov. 16, 1964 10 Sheets-Sheet 1

INVENTOR.
PETER C. GRUNSTRA

Fig. 2

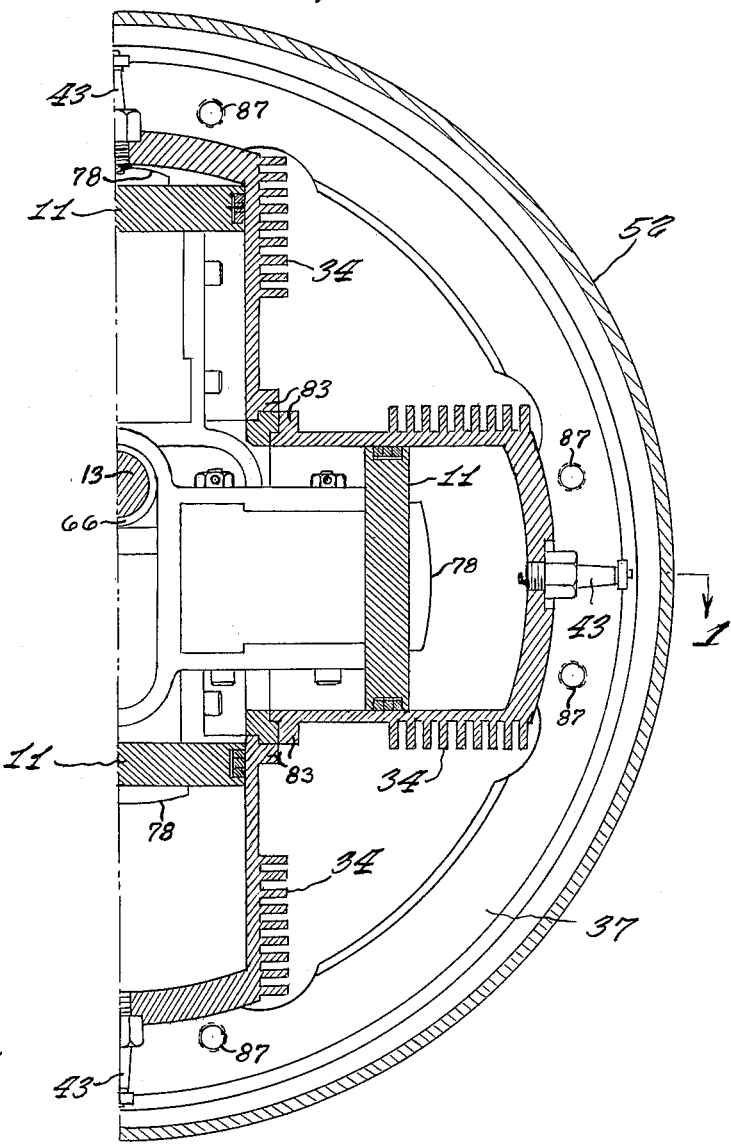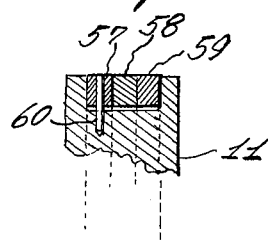

Nov. 30, 1965 P. C. GRUNSTRA 3,220,390
RODLESS ROTARY ENGINES
Filed Nov. 16, 1964 10 Sheets-Sheet 4

INVENTOR.
PETER C. GRUNSTRA

Nov. 30, 1965   P. C. GRUNSTRA   3,220,390
RODLESS ROTARY ENGINES
Filed Nov. 16, 1964   10 Sheets-Sheet 6

INVENTOR
Peter C. Grunstra

Nov. 30, 1965 P. C. GRUNSTRA 3,220,390
RODLESS ROTARY ENGINES
Filed Nov. 16, 1964 10 Sheets-Sheet 7

INVENTOR
Peter C. Grunstra

Nov. 30, 1965    P. C. GRUNSTRA    3,220,390
RODLESS ROTARY ENGINES

Filed Nov. 16, 1964    10 Sheets-Sheet 9

INVENTOR
Peter C. Grunstra

Nov. 30, 1965    P. C. GRUNSTRA    3,220,390
RODLESS ROTARY ENGINES

Filed Nov. 16, 1964    10 Sheets-Sheet 10

INVENTOR
Peter C. Grunstra

United States Patent Office 3,220,390
Patented Nov. 30, 1965

3,220,390
RODLESS ROTARY ENGINES
Peter Combee Grunstra, 105 Spear St., Oakland, N.J.
Filed Nov. 16, 1964, Ser. No. 411,461
4 Claims. (Cl. 123—44)

This application is a continuation-in-part of application Serial No. 172,953, filed Feb. 13, 1962, now abandoned.

This invention relates generally to internal combustion engines, and more specifically, to rotary internal combustion engines.

One object of the present invention is to provide an internal combustion engine of rotary type, having novel means for joining opposed pistons therein.

Another object of the present invention is to provide an internal combustion engine, as described, having novel means for stroking the said pistons.

Another object of the present invention is to provide an engine as described, having novel means for valving the combustible mixture through the engine.

Another object of the invention is to provide an engine, as described, having means for compressing the combustible mixture.

Another object of the invention is to provide an engine, as described, having means for retaining the cylinders on the crankcase.

Another object of the invention is to provide an engine, as described, having novel means for lubricating the engine.

Another object of the invention is to provide an engine, as described, having means for torsion mounting the engine.

A further object of the invention is to provide an engine, as described, having novel means for enclosing the rotating parts of the said engine.

A still further object of the invention is to provide an engine, as described, having means for timing and distributing the ignition current.

Other objects of the invention are to provide an engine of the type described, which is of simple construction, has a minimum number of parts, is inexpensive to manufacture and efficient in operation.

For other objects and for a better understanding of the invention, reference may be had to the following detailed description, taken in conjunction with the accompanying drawings and also in conjunction with the drawings filed in my copending application, Serial No. 172,953, and in which:

FIGURE 2 is a cross-sectional view, taken on the line 2—2 of FIGURE 1, and looking into the direction of the arrows thereof;

FIGURE 3 is a cross-sectional view, taken on the line 3—3 of FIGURE 1, and looking into the direction of the arrows thereof;

FIGURE 3 (a) is an enlarged fragmentary view of a portion of the structure, illustrated in FIGURE 3;

Figure 1:
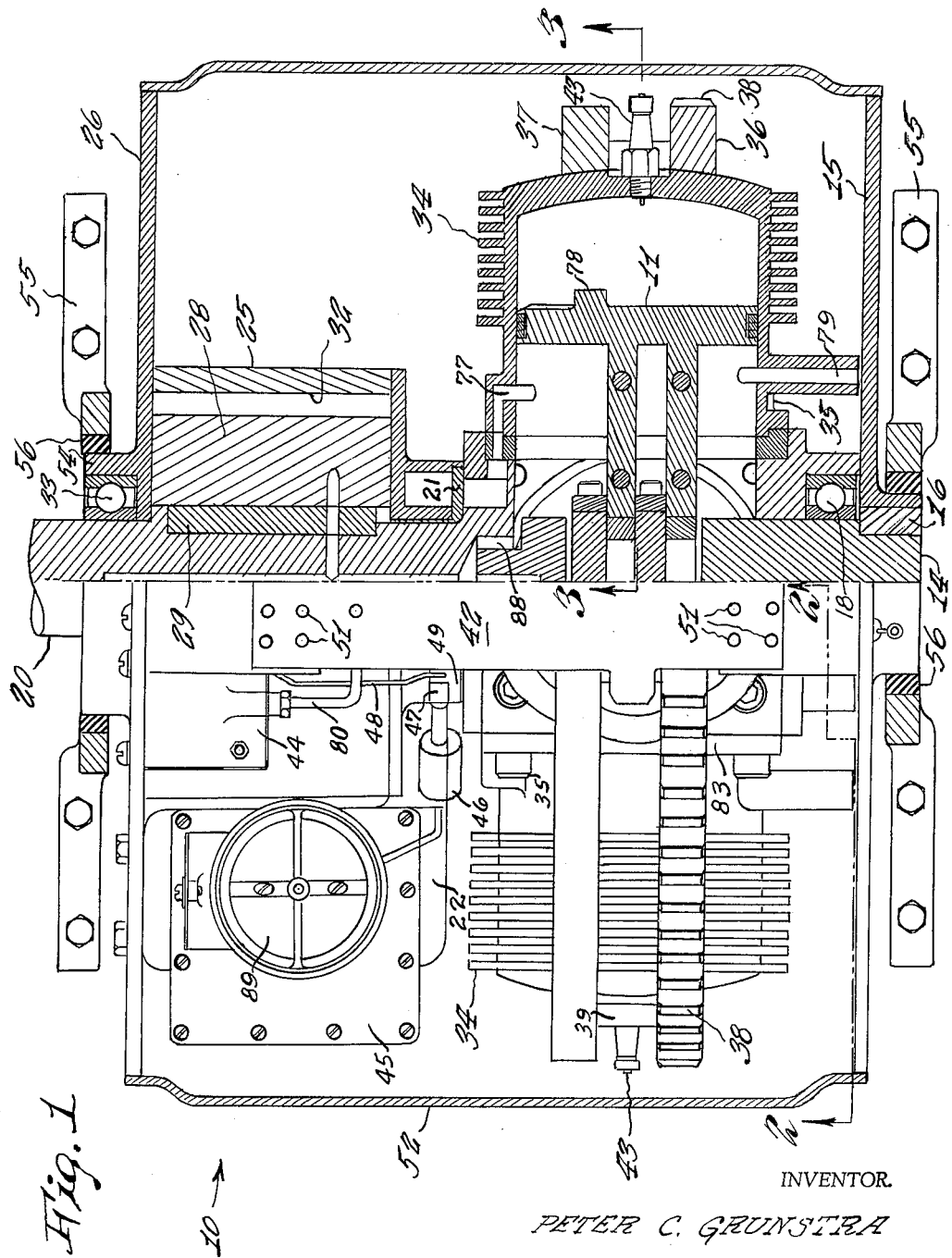
FIGURE 1 is a top elevation view of the invention as viewed along the line 1—1 of FIGURES 2 and 3, in combination and showing the device partly in elevation and partly in cross-section.
Figure 2:
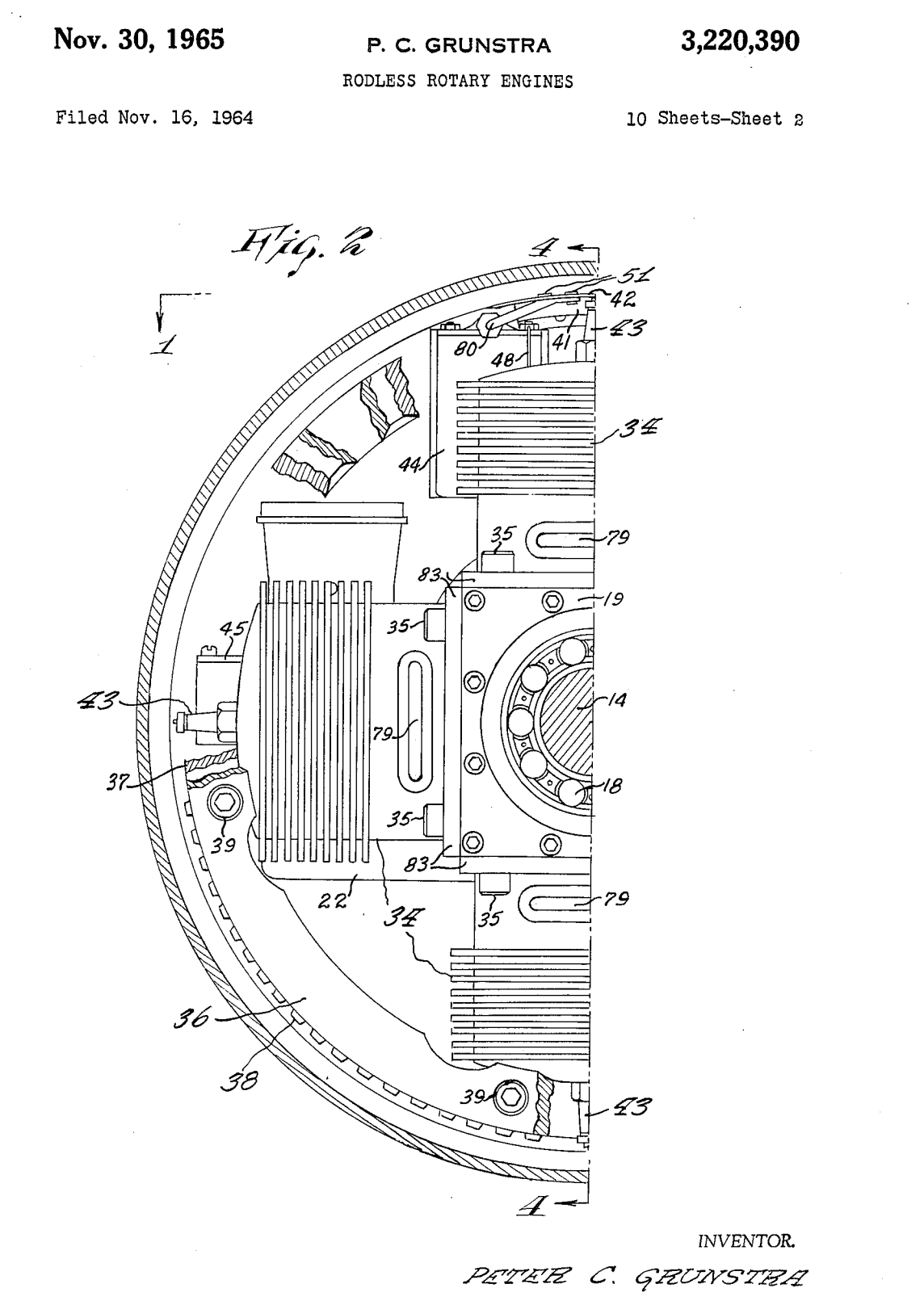
Figure 4:
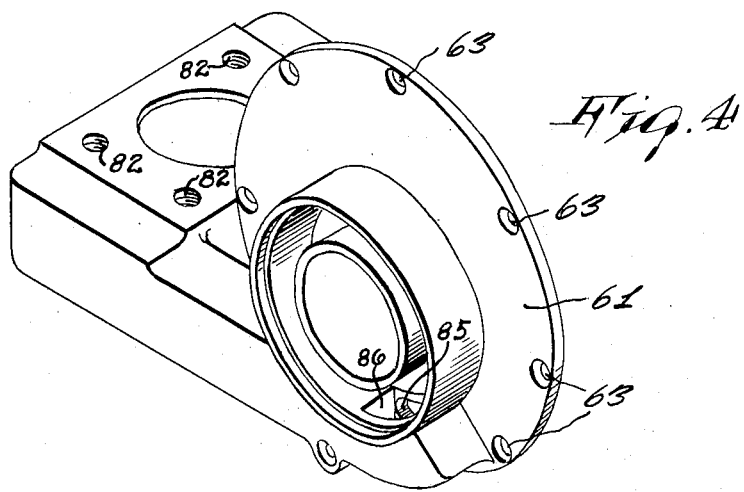
FIGURE 4 is a perspective view of a detail part of the invention.
Figure 5:
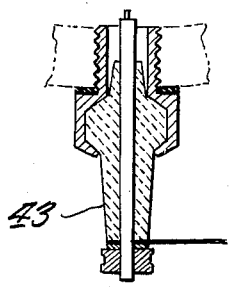
FIGURE 5 is an enlarged cross-sectional view, through one of the spark plugs.
Figure 6:
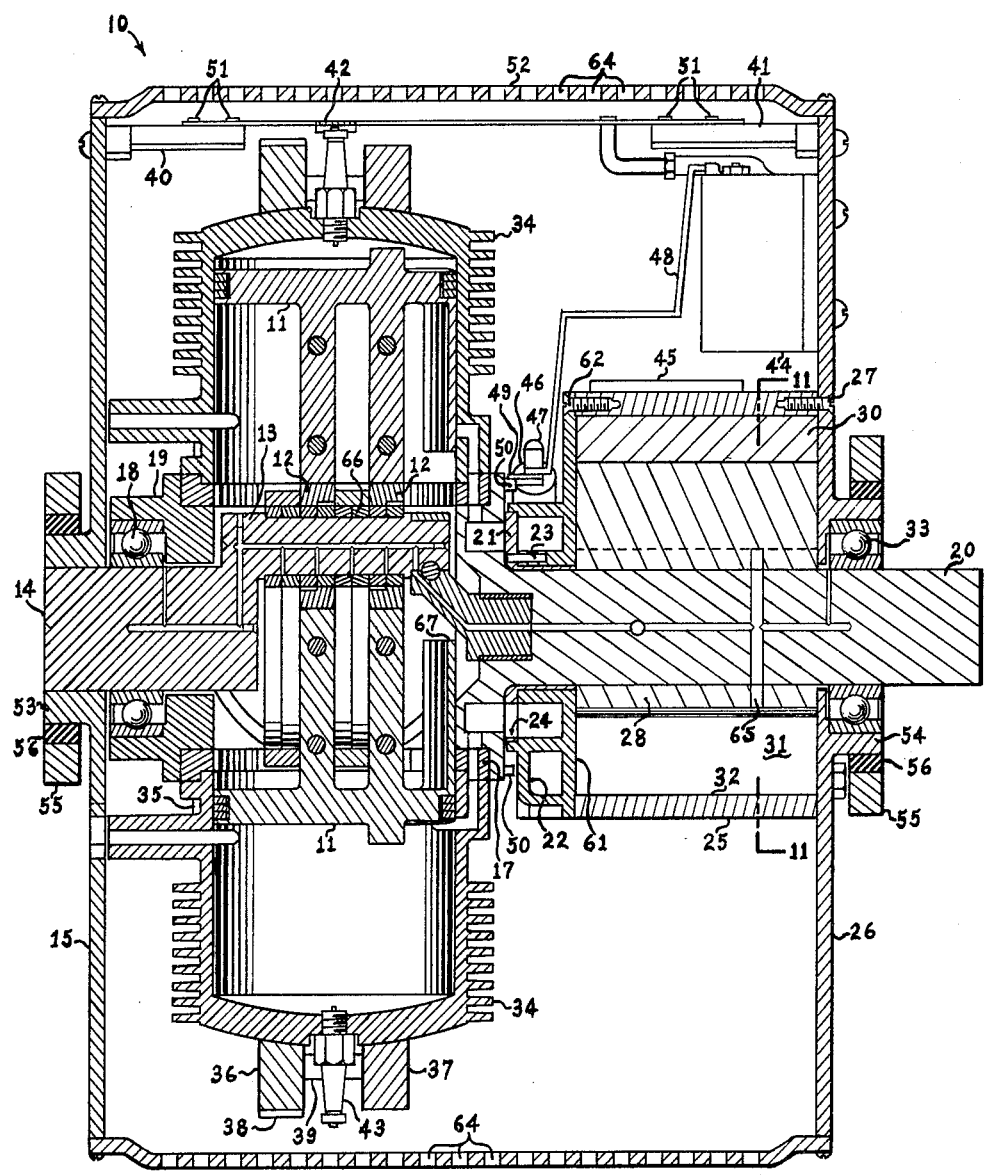
FIGURE 6 is a side cross-sectional view, taken on the line 4—4 of FIGURE 2, and looking into the direction of the arrows thereof.
Figure 7:
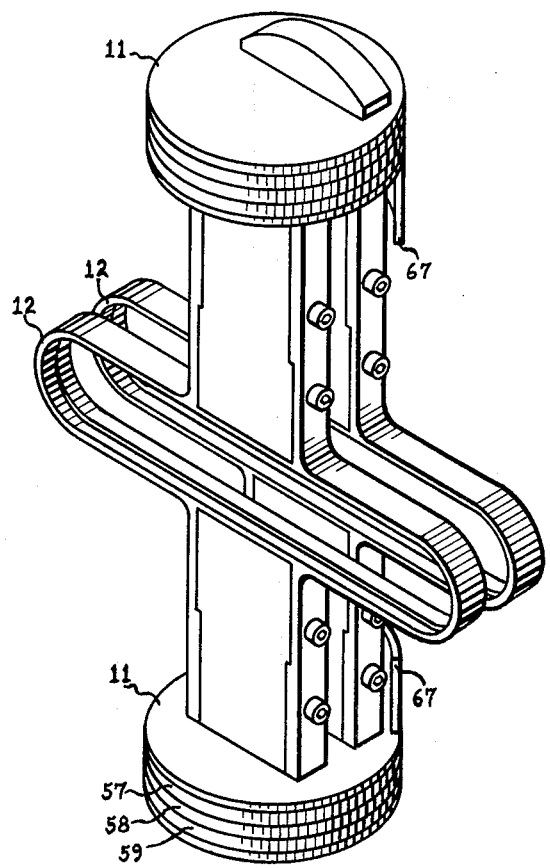
FIGURE 7 is a perspective view of an assembly which forms a part of the present invention.
Figure 8:
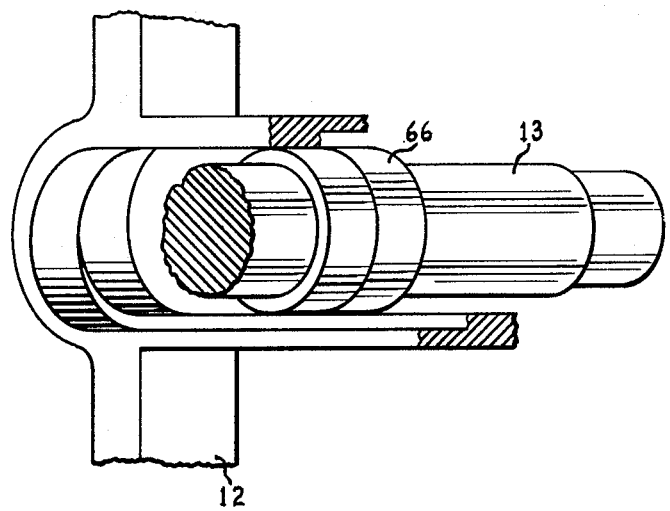
FIGURE 8 is an enlarged fragmentary view of a portion of the structure.
Figure 9:
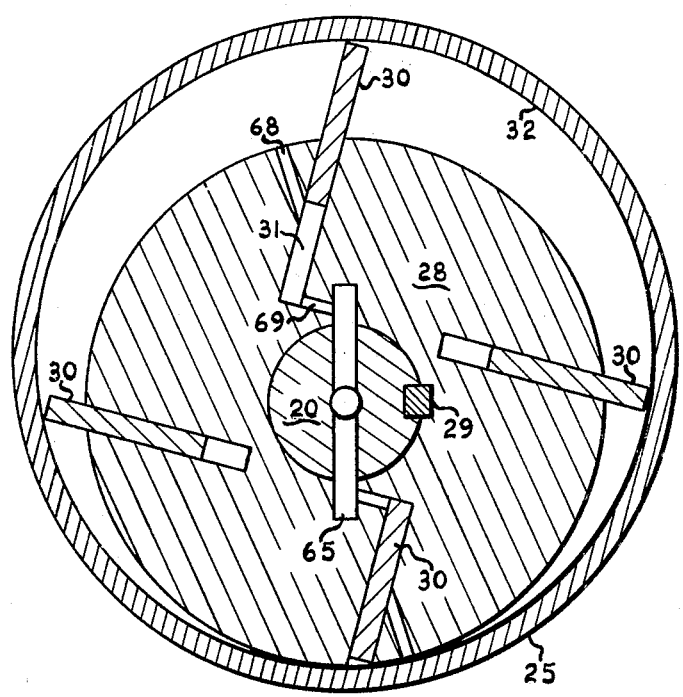
FIGURE 9 is a cross-sectional view, taken on the line 11—11 of FIGURE 6, and looking into the direction of the arrows thereof.
Figure 10:
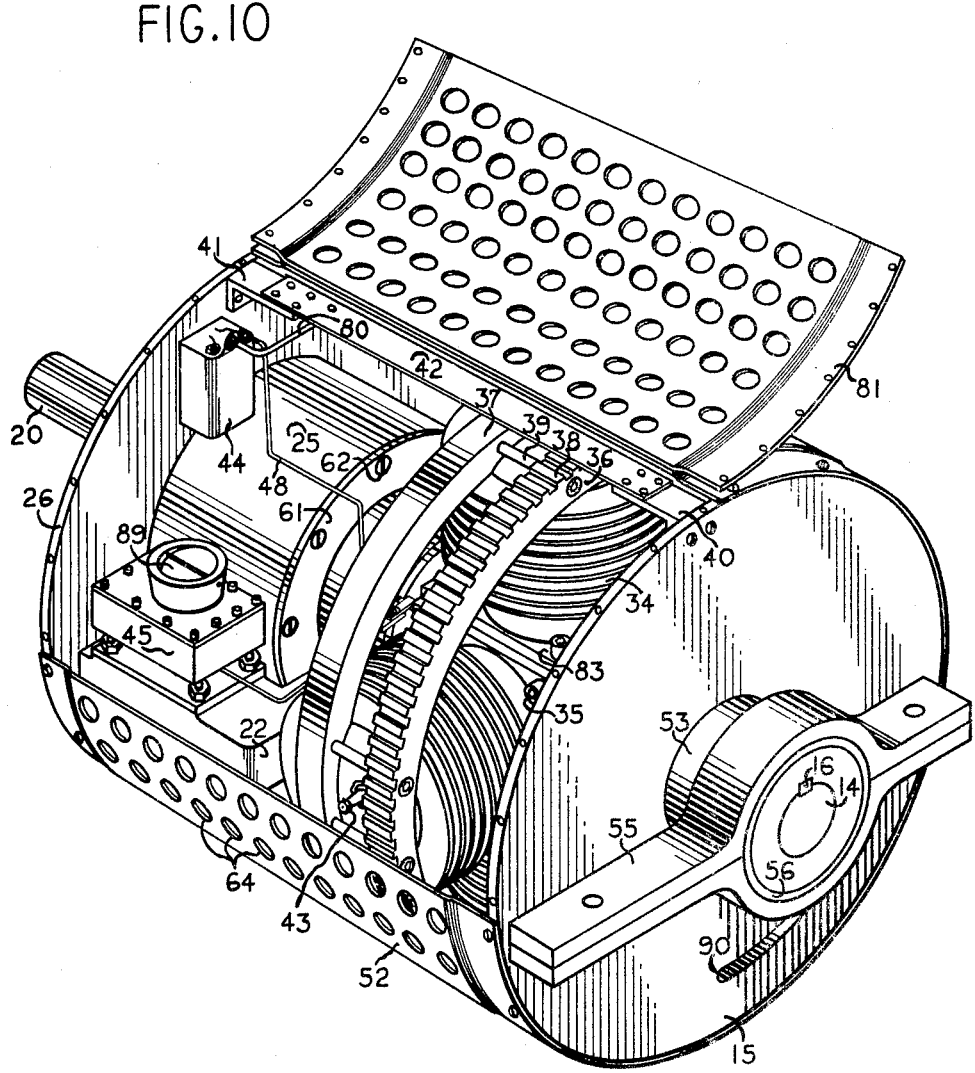
FIGURE 10 is a perspective view of the upper right side of the engine cover.

Referring now more in detail to the drawings, the numeral 10 represents a rodless rotary engine, according to the present invention. In the design of the present invention, there are four pistons designated by the reference numeral 11. The pistons are joined together in pairs by stepped scotch yokes 12, there being two yokes 12 joining each pair of pistons 11. The yokes 12 of each pair are spaced, that is, one yoke is on one side of, and closely adjacent the piston center line while the other yoke is on the opposite side of the piston center line and spaced from the first yoke by approximately the axial width of a yoke, this spaced apart relationship provides a perfect alignment of the said pistons within their respective bores, thereby eliminating piston rocking. Additionally, as shown in FIGURE 6, the pairs of scotch yokes 12 of the respective pairs of pistons 11 may be interdigitated. This will permit the center lines of these pistons to be in a common plane and reducing moments on the crankshaft. Each of said scotch yokes 12 is provided with a yoke slot, 76, having a pair of parallel surfaces transverse to the principle axis of said yoke and is stepped, that is, the yoke slot 76 is made with an offset on the parallel surfaces extending the full length of the slot on the center line cutting through the axial width of said yoke, as shown in FIGURE 8. The said stepped scotch yokes are mounted upon crank throw 13 of crankshaft 14 by means of the yoke slot 76. The said crank throw 13 is equipped with rollers 66, of which there are eight in number, with two of these rollers intermediate crank throw 13 and each yoke slot 76. This method of construction allows the stepped scotch yokes to be in rolling contact on both parallel surfaces of the yoke slot 76, thereby eliminating all sliding friction at points of contact. The said crankshaft 14 is mounted in the front engine support 15, and is held in fixed position relative thereto by means of a key 16, which prevents rotation of the crankshaft. A crankcase 17 is mounted at its forward end on the said crankshaft 14 by means of a single row, single shielded ball bearing 18, mounted in the front bearing housing 19, the said part being fastened to and forming the front portion of the crankcase. The rear portion of the crankcase and the output shaft form an integral part, said part preferably being made as a forging. The forepart of the shaft 20, forming the rear part of the crankcase, is slotted at 90 degree intervals, to provide for admission of fuel mixture to the respective cylinders, as they reach the start of their cycle. To the rear portion of the crankcase and the output shaft 20, an intake manifold bushing 21, is fitted and fixed from rotation in the manifold 22, by means of a dowel pin 23. This bushing is slotted through its flanged portion at the bottom, as indicated at 24, to coincide with the slot in the rear part of the crankcase, thus allowing the fuel mixture to be admitted to the cylinders. The admission of fuel mixture to the cylinders is controlled, not by the intake manifold bushing 21, as in my copending application, Serial No. 172,953, filed February 13, 1962, but by the partial piston skirt 67, which is an integral part of the pistons 11. The intake manifold 22, and casting 61, form the front portion of a compressor 25. This, in turn, is mounted, axially eccentric, to the rear engine support 26, by means of a plurality of slotted flat head screws 27. The said compressor is provided with a rotor 28, which is keyed to the output shaft 20, by means of key 29, thus, the rotor 28 revolves at the same engine r.p.m. The said rotor is provided with a plurality of vanes 30, which are set so that they may slide freely, each in their respective slots 31, and follow the inside surface 32, of the compressor housing. Adjacent to the slots 31, a plurality of holes, as shown in FIGURE 9, and designated by the reference numeral 68, are drilled at an angle to break through the slots 31, just under the vanes 30, at the extreme point of travel in the slots 31, thus, as the engine is rotated, the vanes trap the residual oil, which is left in the compressor 25 by the fuel mixture as it passes through. The said fuel mixture which contains the lubricating oil in a predetermined amount, enters the compressor 25 through the intake manifold 22 and the slot 84, and some of the lubricating oil in the said mixture enters the holes 68, and the slots 31, in the compressor rotor 28. When the rotor revolves, it causes the vanes 30, which are in contact with the inside surface 32 of the compressor 25, to slide into the slots 31, thereby closing the holes 68. As the rotor continues to revolve it causes the vanes 30 to slide further into the slots 31, thereby forcing the trapped residual oil into the cross-holes 69 and 65, through the output shaft 20, and the crankshaft 14, to the crankshaft pilot bearing 88, the crank throw 13, the rollers 66, the front bearing 18, and the rear bearing 33, thus the rotor vanes serve the unique twofold purpose of compressing the fuel mixture for the engine and, also, force feeds the residual oil to the engine bearings. The rearward portion of the rear engine support 26, is machined out to receive therein a rear main bearing 33, the same comprising a single row, single shielded ball bearing. Four cylinders 34, are radially disposed at 90 degree intervals around the said crankcase 17, and are equipped with piston assemblies in coplanar arrangement, one of such assemblies being shown in FIGURE 7. The cylinders 34 are fastened by means of cap screws 35, which pass through the flange 83 at the base of the cylinder 34, and thread into the crankcase 17. The cylinders 34 are also fastened and held in place by means of retaining rings 36 and 37. Ring 36 serves as the front retaining ring, and has transverse clearance holes to receive the cap screws 39, shown in FIGURE 2. Ring 37 serves as the rear retaining ring, and has transverse threaded holes 87, shown in FIGURE 3, the said holes receiving the threaded portion of the cap screws 39. The said rings are of one piece construction, thereby eliminating fasteners which would be under extreme centrifugal force and hence liable to failure in use. The said retaining rings are machined to fit the radius on the cylinder heads, and are pulled toward each other by means of the cap screws 39, which are of socket head type. As the screws 39 are tightened, the rings, acting on the radius on the cylinder heads, exert pressure on the cylinder heads, forcing the cylinders tightly against the crankcase. The rings are provided for the purpose of preventing the cylinders from being pulled off the engine due to centrifugal force developed as the engine rotates, and also, for the purpose of providing flywheel and ring gear for the starting motor, the gear teeth being shown at 38. It is to be noted that the rings are placed on the assembly before the front and rear supports are placed in position. A pair of insulator blocks 40 and 41, are mounted to the upper portions of the front and rear engine supports, and are provided for the purpose of retaining in insulated position a conductor 42, which serves to provide ignition means to each spark plug 43, which are located in the center of the cylinder head. The said conductor is affixed to the insulator blocks 40 and 41 by means of brass rivets 51, or the like, and is connected to the coil 44 by means of the secondary coil wire 80. The said conductor conveys the electrical current to the spark plugs from the ignition coil 44. Thus, by this manner, each cylinder receives a spark when the piston reaches the top of the stroke, and thus, the motor, by means of its revolutions provides the timing for the ignition to the respective cylinders. A vacuum spark advance 46, is provided for controlling the point the spark would occur in the cylinder. This vacuum spark advance moves the insulator block 47, which, in turn, moves the contact plate 49, the said contact plate being mounted upon the bottom portion of the insulator block 47. A primary ignition wire 48 is affixed to the insulator block-contact plate assembly by any conventional means such as a rivet. The contact plate 49 makes contact with the contact pin 50, the said pin grounding the ignition coil 44. A suitable carburetor may be employed in the present device and a preferred arrangement and location is shown in FIGURE 1, the carburetor 45, being flange mounted to the intake manifold 22 by means of the threaded holes 82, shown in FIGURE 5. In FIGURE 5, there is shown a casting 61, which forms the front side of the compressor and which is an integral part of the intake manifold 22, this said casting being fastened to the front part of the compressor housing by means of the screws 62, the said screws passing through the holes 63. After the engine is fully assembled, a perforated rolled plate 52, is mounted peripherally around the engine, and is fastened to the said front and rear supports 15 and 26. The perforations 64 in the rolled plate 52, are provided for allowing air to enter and circulate about the engine, the engine being of air cooled design. The rolled plate 52 serves the threefold purpose of providing the spacing between the rotating and stationary parts of the engine, it maintains alignment between the support plates, and also forms a safe enclosure for the entire engine. The said rolled plate would be provided with an access opening 81, shown in FIGURE 10, for the purpose of servicing the engine. The front support 15, and the rear support 26, are each provided with axial extending hubs 53 and 54, whereby the engine may be mounted upon supports 55, which may be bolted to any solid surface, the said supports 55 being shown in FIGURE 1. Rubber bushings 56 are provided as shock mounts between the hubs 53 and 54, and the supports 55, thus, the engine is torsionally mounted.

It is to be noted that each piston is provided with a plurality of piston rings 57, 58, and 59, the said rings being mounted adjacent to each other, as shown in FIGURE 3 (*a*), thereby providing an exceptionally good gap seal. The gaps on each of the said rings are staggered, and fixed to the piston by means of pins 60, to prevent rotation thereof, thus, the gaps are retained in staggered position.

Figure 11:
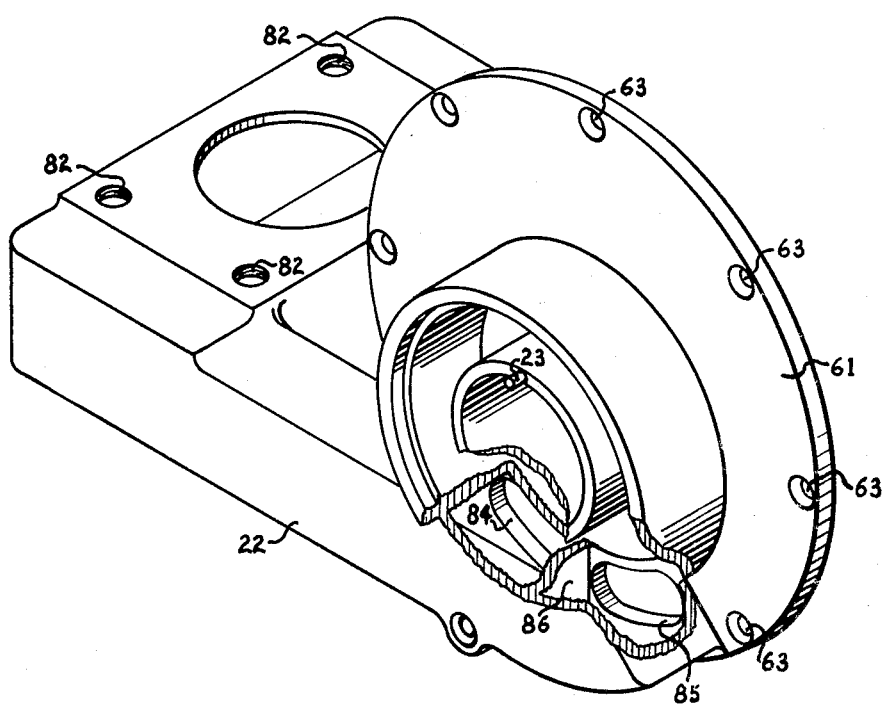
FIGURE 11 is a perspective view of a detail part of the invention.

In operation, the rodless rotary engine performs as follows:

When the output shaft is rotated, the fuel mixture, formed by air passing through the venturi of the carburetor 45, together with the lubricant which is mixed with it, is drawn through the carburetor 45 and manifold 22, through the slot 84, into the compressor 25, and compressed by means of the radially slidable vanes 30, which are in sliding engagement with the inner wall 32, of the compressor housing, the said vanes trapping the fuel mixture ahead of them, forcing the mixture through the slot 85, into the outlet side of the manifold 22, the inlet and outlet side of the manifold being separated by the wall 86, shown in FIGURES 5 and 11 the fuel mixture is then forced through the slot 24 in the bushing 21, and the coinciding slot in the output shaft 20. As the engine is further rotated, the piston head 11, which is in the cylinder approaching dead center at the bottom, begins to uncover the intake port 77 in the cylinder, and the fuel mixture is forced into the cylinder. As the engine is further rotated, the piston begins to rise in the cylinder bore by means of the scotch yokes 12 and the crank 13, and the piston 11 and the piston skirt 67 closes the intake port 77. Continued rotation causes the piston and skirt to rise further in the cylinder, thereby closing the exhaust port 79 and compressing the fuel mixture in the cylinder. When the piston has reached a predetermined height in the cylinder bore, an ignition spark for the fuel mixture is introduced in the said cylinder by means of the spark plug 43, the conductor 42, the secondary coil wire 80, the coil 44, the contact plate 49 and the pin 50, which grounds the coil. As the particular piston reaches that point in the stroke where the spark occurs, the fuel is ignited and the piston is forced downward in the cylinder, this downward force acting on the crank 13, through the stepped scotch yokes 12 and the rollers 66, which, in turn, causes the cylinder assembly and crankcase to rotate, this in turn, causes the adjacent piston to rise in its respective cylinder bore, compressing the fuel mixture therein, and performing the operation just described. Thus, each of the four pistons performs in continuation the cycle, as set forth. The operational speed of the engine is controlled by means of the carburetor butterfly valve 89 in a conventional manner, and the exhaust of the engine is accomplished by means of the cylinder ports 79, and the slotted opening 90 in front support plate 15, which takes place when the piston is descending in the bore of the cylinder, and the piston head uncovers the abovementioned port in the cylinder. After the exhaust port 79 is uncovered, the intake port 77 begins to uncover, permitting the introducton of fuel mixture, which enters the cylinder and strikes the baffle 78 on top of the piston 11. The said baffle deflects the fuel mixture in an upwardly direction, and causes the remainder of the previous cylinder charge to be scavenged from the cylinder, after a working stroke.

While various changes may be made in the detailed construction, is shall be understood that such changes shall be within the spirit and scope of the present invention, as defined by the appended claims.

What I claim as new and desire to protect by Letters Patent of the United States is:

1. In a rodless rotary engine, the combination of spaced apart front and rear engine supports, said supports comprising opposite end walls of a perforated cylindrical engine cover, the said cylindrical engine cover perforated completely around its periphery and from front to rear engine support, said perforations for allowing air to enter and circulate about the engine, the said cylindrical engine cover maintaining the spaced apart relationship of the said front and rear engine supports, said front support carrying a crankshaft and said rear support carrying an output shaft, said crankshaft and said output shaft being in axial alignment relative to each other, the said crankshaft being keyed in a stationary non-rotatable position to said front engine support, the said crankshaft having a single throw, said throw being equipped with a plurality of rollers, a crankcase mounted on said crankshaft rotatively free relative to the said crankshaft, a plurality of cylinders mounted on said crankcase and radially disposed about the said crankshaft at 90 degree intervals in coplanar arrangement, each of the said cylinders having a piston, the said pistons being joined together in pairs by a set of two stepped scotch yokes, each of said yokes being provided with a yoke slot having a pair of confronting parallel surfaces transverse to the principal axis of said yoke, the said parallel surfaces extending the full length of the yoke slot, one of said pair of confronting parallel surfaces being offset along said yoke axis relative to the other of said pair of surfaces, and thus being stepped, the said yokes of each pair being spaced so that one yoke is on one side of, and closely adjacent the piston center line while the other yoke is on the opposite side of the piston center line and spaced from the first yoke by approximately the axial width of a yoke, the said yokes being mounted on the throw of said crankshaft, with two of the said rollers intermediate the said crank throw and each yoke slot, one of said rollers contacting the parallel surface on one side of the yoke slot, the other of said rollers contacting the parallel surface on the opposite side of the yoke slot.

2. In a rodless rotary engine, the combination as set forth in claim 1, wherein a front bearing housing forms the front part of the crankcase, the rear portion of said crankcase being integral with said output shaft, the forepart of said output shaft being plurally slotted to form a passageway for selective admission of fuel into the said cylinders.

3. In a rodless rotary engine, the combination as set forth in claim 2, wherein a compressor rotor is mounted in keyed relationship on said output shaft, said rotor having a plurality of radially slidable vanes, each within a radially extending slot in said rotor, said vanes slidably engaging the inside diameter of a cylindrical compressor housing, said housing being mounted axially eccentric on the said rear engine support, a plurality of holes located adjacent to the aforementioned vane slots on the periphery of the compressor rotor, said holes being drilled at an angle to break through the vane slots just under the extreme point of vane travel, said holes for allowing residual lubricating oil to enter the vane slots, a plurality of cross holes located at the bottom of said vane slots and interconnecting said vane slots with oil holes in output shaft, crank throw, and crankshaft, said holes for allowing the said vanes to force feed residual lubricating oil to all engine bearings.

4. In a rodless rotary engine, the combination as set forth in claim 2, wherein the heads of said cylinders are made with a radius, a pair of retaining rings, said retaining rings machined to fit the radius on the said cylinder heads, the said retaining rings being pulled toward each other by means of cap screws, said retaining rings exerting pressure on the heads of said cylinders thereby forcing the cylinders against the crankcase.

References Cited by the Examiner

UNITED STATES PATENTS

| | | | |
|---|---|---|---|
| 548,628 | 10/1895 | Conner | 123—44 |
| 645,893 | 3/1900 | Dean. | |
| 956,881 | 5/1910 | Bonnett | 123—44 |
| 981,995 | 1/1911 | Godlov et al. | 123—44 |
| 1,052,658 | 2/1913 | Escher | 123—44 |
| 1,091,983 | 3/1914 | Sutton | 123—44 |
| 1,109,270 | 9/1914 | Wallis | 123—44 |
| 1,111,682 | 9/1914 | Sutton | 123—44 |
| 1,114,816 | 10/1914 | Stapp | 123—44 |
| 1,117,464 | 11/1914 | Twombly | 123—44 |
| 1,227,452 | 5/1917 | Kenyon | 123—44 |
| 1,276,351 | 8/1918 | Halsey | 123—44 |
| 1,509,885 | 9/1924 | Trebert | 123—44 |
| 1,705,130 | 3/1929 | McKlusky | 123—44 |
| 1,923,744 | 8/1933 | Petrilli | 123—44 X |
| 2,242,231 | 5/1941 | Cantoni | 123—44 |
| 2,383,996 | 9/1945 | Stucke | 123—44 X |
| 2,962,861 | 12/1960 | Beaven | 123—44 X |
| 2,963,705 | 12/1960 | Beaven. | |

FOREIGN PATENTS

| | | |
|---|---|---|
| 29,427 | 9/1931 | Australia. |
| 416,201 | 8/1910 | France. |
| 491,139 | 1/1919 | France. |
| 800,337 | 4/1936 | France. |
| 122,186 | 7/1901 | Germany. |
| 555,091 | 1/1957 | Italy. |

SAMUEL LEVINE, *Primary Examiner.*

KARL J. ALBRECHT, *Examiner.*